United States Patent
Kill

(10) Patent No.: US 6,634,163 B2
(45) Date of Patent: Oct. 21, 2003

(54) LEAF PICKUP AND DISCHARGE DEVICE

(76) Inventor: Michael J. Kill, 204 Dellrose Cir., Taylors, SC (US) 29687

( * ) Notice: Subject to any disclaimer, the term of this patent is extended or adjusted under 35 U.S.C. 154(b) by 40 days.

(21) Appl. No.: 10/055,163

(22) Filed: Oct. 29, 2001

(65) Prior Publication Data

US 2003/0079460 A1 May 1, 2003

(51) Int. Cl.[7] ................................................. A01D 7/00
(52) U.S. Cl. .................................. 56/400.08; 56/400.03
(58) Field of Search ........................... 56/400.08, 400.03, 56/400.1, 400.16, 400.19, 400.21; 294/61; D8/13

(56) References Cited

U.S. PATENT DOCUMENTS

| | | | | |
|---|---|---|---|---|
| 1,246,487 A | * | 11/1917 | Summers et al. | 294/61 |
| 1,993,314 A | * | 3/1935 | Belford | 294/61 |
| 2,191,226 A | * | 2/1940 | Clem | 30/129 |
| 2,695,188 A | * | 11/1954 | Klausman et al. | 294/61 |
| 2,800,354 A | * | 7/1957 | King | 294/61 |
| 2,804,336 A | * | 8/1957 | Thompson | 294/61 |
| 3,633,958 A | * | 1/1972 | Mesrobian | 294/61 |
| 4,081,192 A | * | 3/1978 | Jones | 294/61 |
| 5,370,433 A | * | 12/1994 | Yost | 294/50.5 |
| 5,642,911 A | * | 7/1997 | Gatch | 294/61 |

* cited by examiner

*Primary Examiner*—Árpád F Kovács
(74) *Attorney, Agent, or Firm*—McNair Law Firm, P.A.

(57) ABSTRACT

A device for picking up scattered leaves on a lawn by piercing them with an array of sharp tines extending from a support plate that is held by an extended handle so the user can press the tines into leaves from a standing position. A resiliently mounted discharge plate is carried below the support plates (upper and lower) with the tines extending through respective orifices in the discharge plate. A lever associated with the handle may be actuated to move the discharge plate downwardly and remove leaves from the tines.

3 Claims, 6 Drawing Sheets

LEAF PICKUP AND DISCHARGE DEVICE

FIELD OF THE INVENTION

This invention relates to a leaf pickup and discharge device to remove leaves from a lawn or from a pine straw (needles) area. Particularly, this invention relates to a device for removing small groups of scattered leaves on an otherwise clean lawn in order to maintain the ultimate in a clean lawn appearance.

BACKGROUND OF THE INVENTION

In the prior art the range of leaf removal devices and methods goes from the ordinary hand-held lawn rake to sophisticated tractor mounted vacuuming, grinding and compacting machines. There have been attempts in the past to give manual rakes a leaf pickup feature; and, as an example of such a device reference is made to U.S. Pat. No. 3,643,410 entitled "Rake and Tong Combination" which was granted to Walter A. Menning on Feb. 22, 1977.

Often in prior art devices a lawn mower is provided with an attachment to rake or pickup leaves. As an example of this type of device, reference is made to U.S. Pat. No. 4,987,731 entitled "Leaf Rake Attachment" which was granted on Jan. 29, 1991 to Vito Ciancianilli, et al.

A more complex device is illustrated by U.S. Pat. No. 6,263,649 entitled "Leaf Gathering and Compressing Machine and Method" which issued to Thomas Gress, et al. on Jul. 24, 2001.

In the Rake and Tong Combination mentioned above and in devices similar to it there is no provision for positive securing of a leaf as the leaves must be raked together and then the rotatable tong portion must close around the leaves so they can be lifted. This requires a rather awkward holding of the tongs closed while the leaves are being transported to a receptacle. In the Leaf Rake and Attachment device and in the Leaf Gathering and Compressing devices the homeowner must get out and crank up his mower or tractor even if only a few leaves or a few scattered leaves are to be removed.

Accordingly, it is a primary object of the present invention to provide a device to remove scattered leaves from a lawn without having to use a device with a motor or engine which requires time consuming setup and unnecessary consumption of fuel.

It is a further object of the present invention to provide a method of removing leaves from a lawn which will require little if any bending or stooping by the user.

It is still another object of the present invention to provide a method of removing leaves from a lawn wherein the leaves, when once picked up, remain on the pickup device with little opportunity for the leaves to be dropped on their way to a leaf collection area or to a receptacle.

These and other objects of the present invention will be more fully understood from the summary of the invention, drawings, and detailed description which follow:

SUMMARY OF THE INVENTION

In one aspect, the present invention is a leaf pickup and discharge device comprising a hand-held member having at least one leaf piercing tine for picking up leaves, and a resiliently mounted leaf removal member associated with the piercing tine for removing leaves therefrom. Thus, leaves can be picked up, held, transported, and discharged where desired. The device is readily stored and is always ready for instant use without inconvenient and time consuming preparation.

In another aspect, the present invention is a leaf pickup and discharge device including a multiplicity of parallel, substantially equal length leaf piercing tines, each having a sharp piercing end and a base end, said tines being fixedly mounted on a support plate whereby when said tines are pressed against leaves scattered on a yard surface the leaves will be pierced and remain on the tines; and a resiliently mounted member surrounding each tine for a portion of the length thereof, said member being disposed to move from a first position adjacent to the base of said tines to a second position adjacent to the piercing end of said tines whereby the movement of said member from the first position to the second position removes any leaves collected on said tines.

In yet another aspect, the present invention is a leaf pickup and discharge device comprising support plate compressing upper and lower support plates, the upper plate having upper and lower surfaces with a plurality of passageways formed therein extending from the upper to the lower surface; a plurality of rigidly mounted leaf pickup tines extending downwardly from and perpendicularly to the lower surface of said plate; a support shaft extending upwardly from the central area of the upper surface of said upper plate, said shaft being a handle for said device; a discharge plate positioned below said lower plate, said discharge plate having upper and lower surfaces, and a plurality of orifices formed therein in a pattern corresponding to the pattern of said tines, said orifices extending through said discharge plate from the upper to the lower surfaces thereof, the walls of said orifices being perpendicular to said upper and lower surfaces and being adapted to allow a corresponding tine to pass freely therethrough; discharge plate support members attached to the upper surface of said discharge plate, each support member extending through a respective one of said passageways in said plate, said member being disposed to move freely within said passageway; a sleeve slidably positioned around said shaft, said support members being fastened to said sleeve; a coil spring around said shaft located between the sleeve and said upper surface of said upper plate, said spring being compressed when said sleeve moves downwardly; a discharge lever carried at one end by a first pivot, said first pivot journal being fixedly mounted with respect to said sleeve and discharge plate, the other end of said lever being provided with a handle grip, a second pivot being located between said two ends of said lever, a connecting rod carried at one end in said second pivot and being rotatably attached to said upper support plate at the other end whereby when the handle and lever are rotated upwardly said spring is compressed, said support members forcing the discharge plate downwardly for substantially the length of the tines that are disposed in the discharge plate passageways, whereby leaves collected on said tines will be removed therefrom by the movement of the discharge plate.

DESCRIPTION OF THE DRAWINGS

The drawings attached hereto and made a part of this disclosure are provided by way of illustration and do not limit the scope of the invention.

The invention will be more readily understood from a reading of the following specification and by reference to the accompanying drawings, wherein an embodiment of the invention is shown and wherein:

IN THE DRAWINGS

Figure 1:
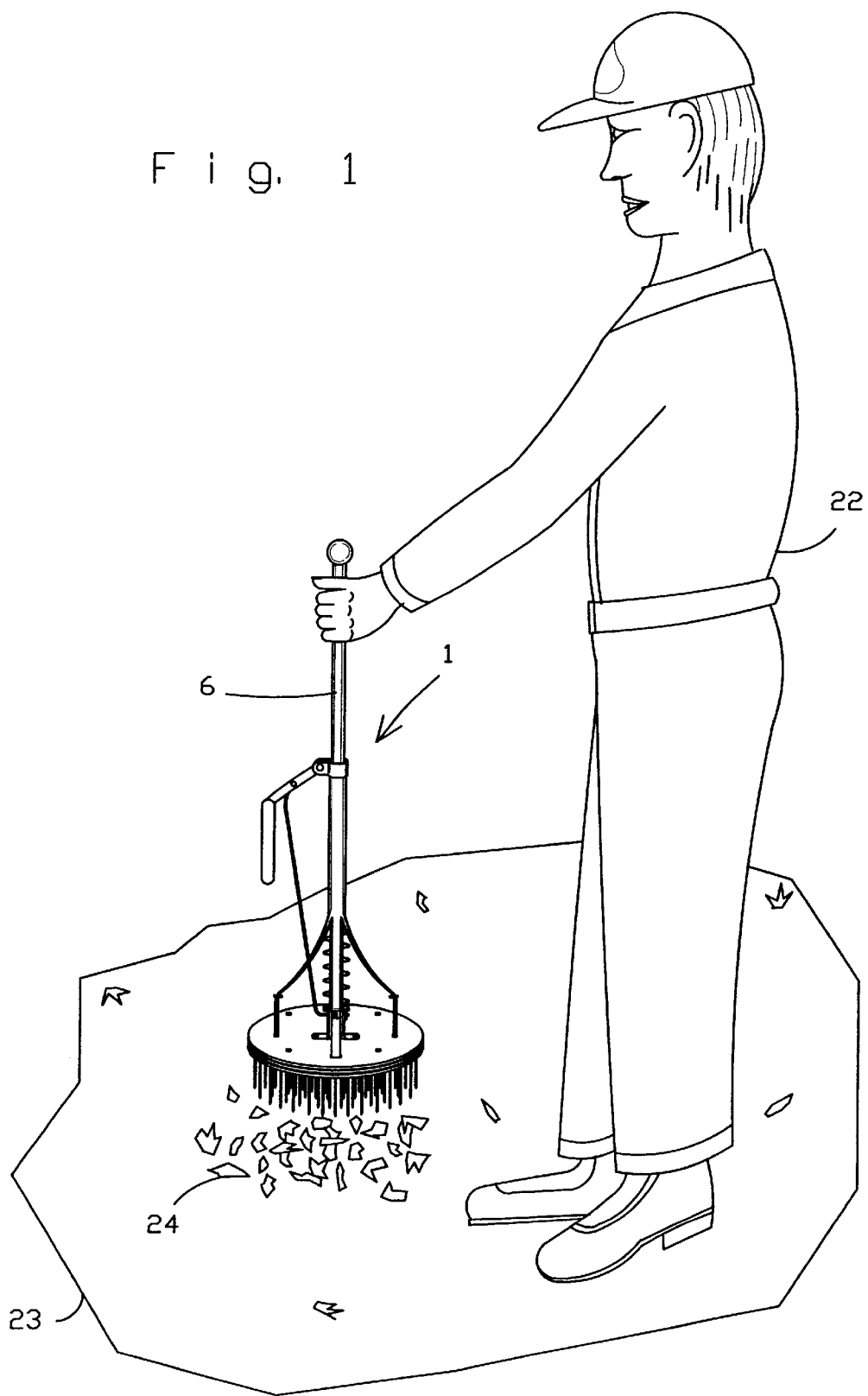
Figure 2:
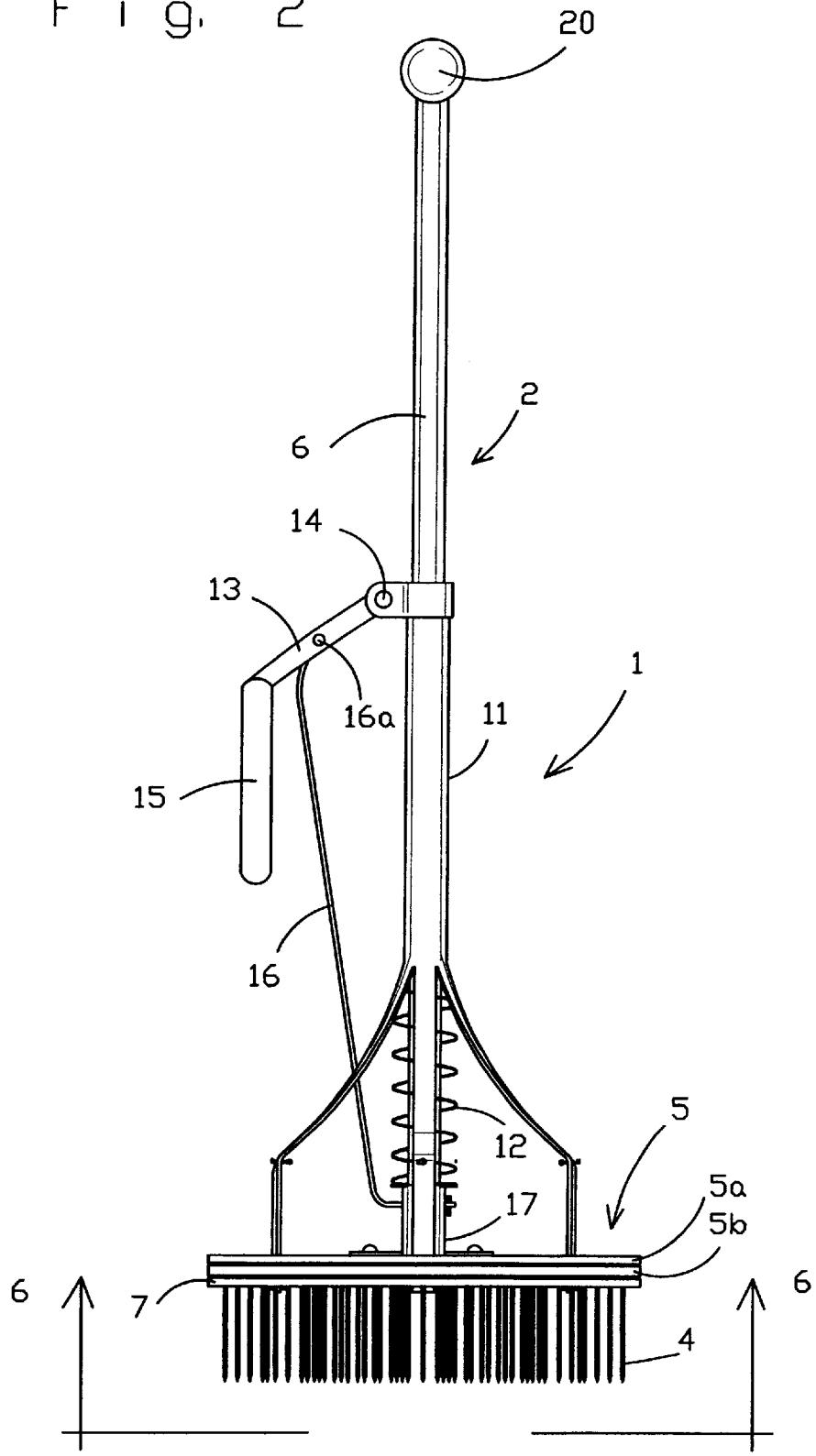
Figure 3:
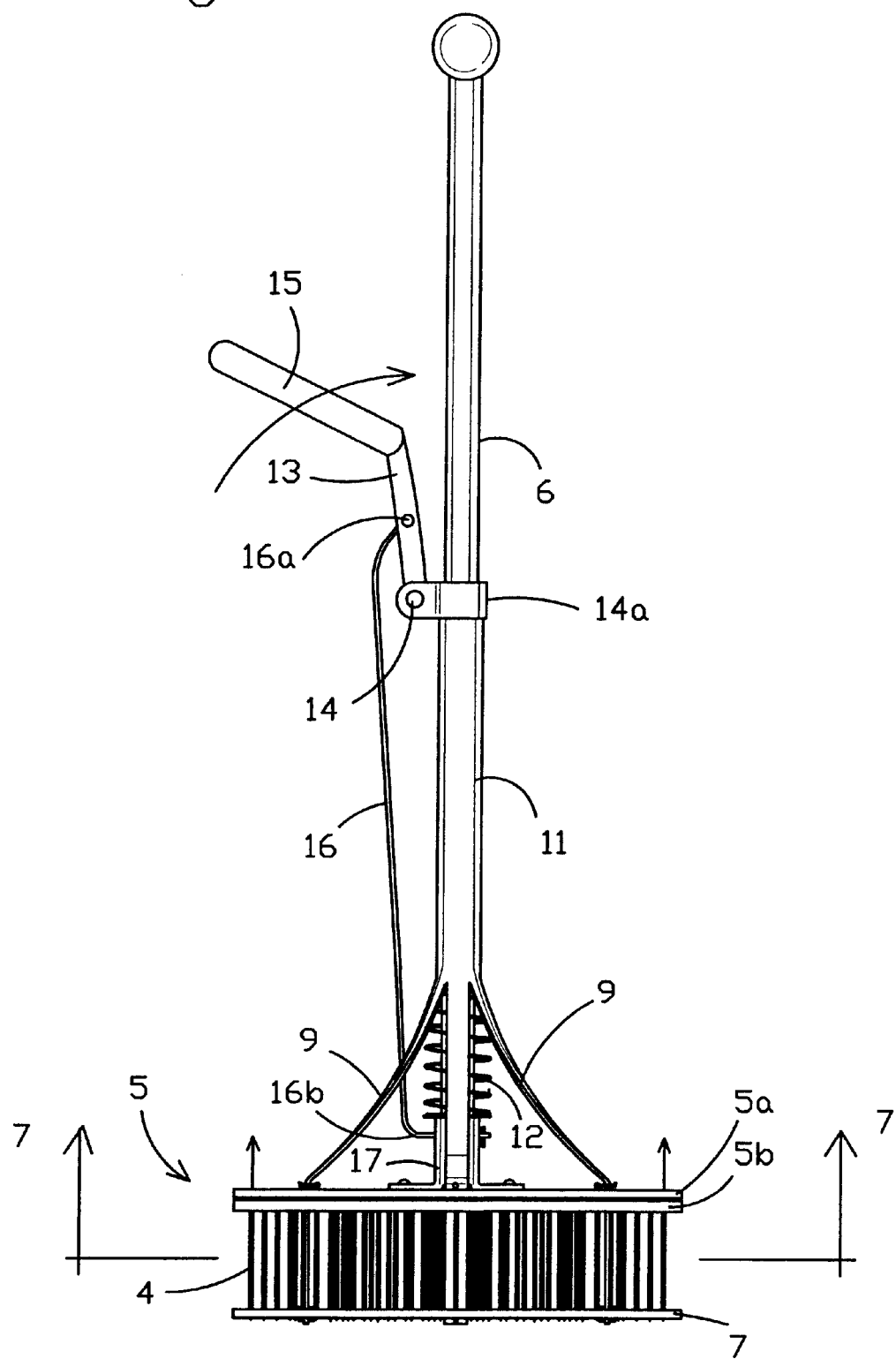
Figure 4:
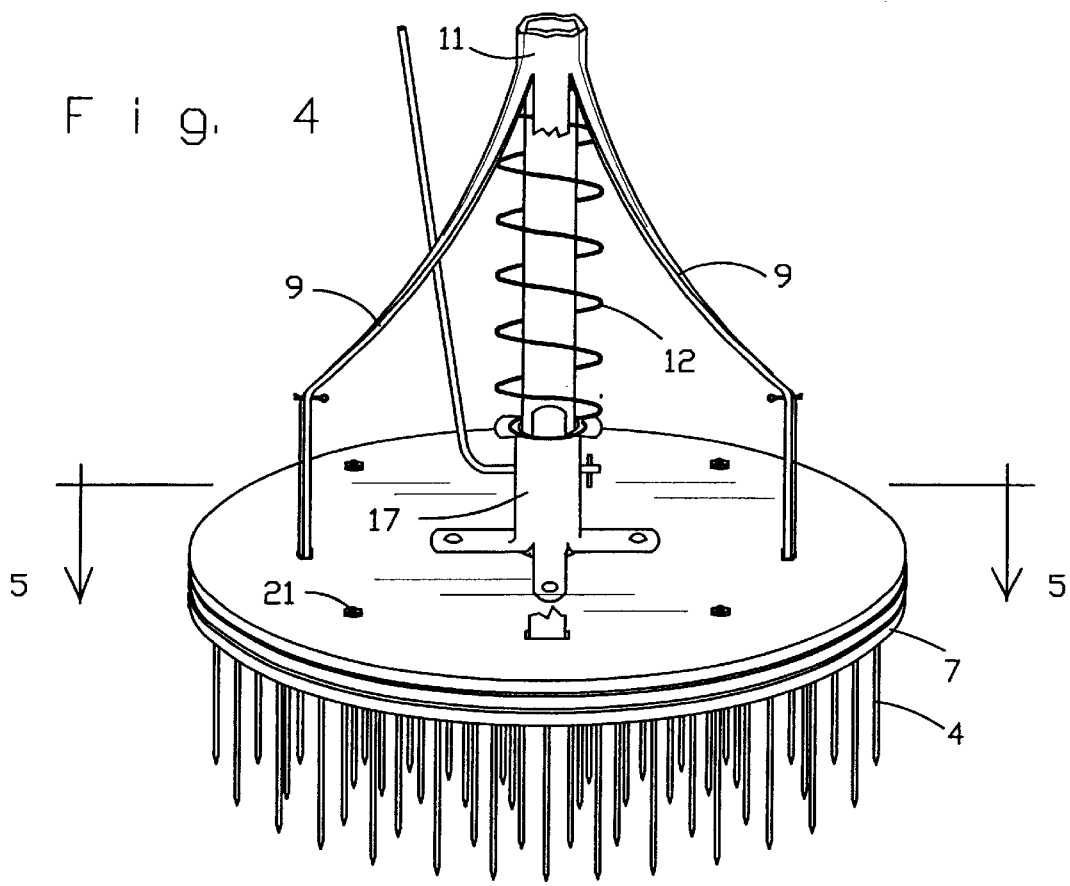
Figure 5:
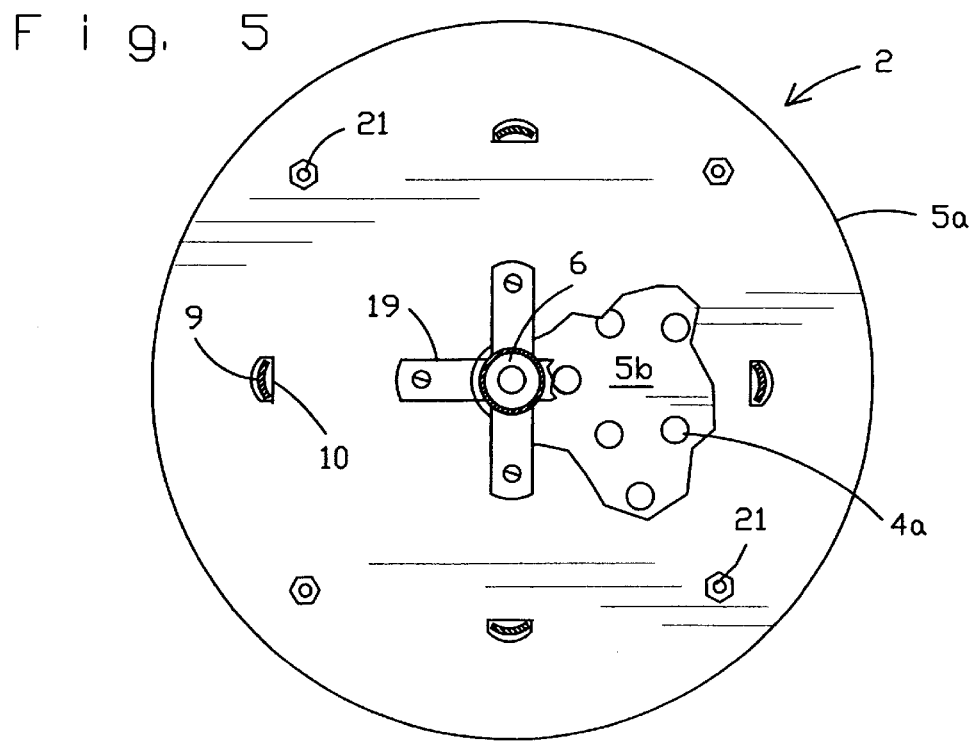
Figure 6:
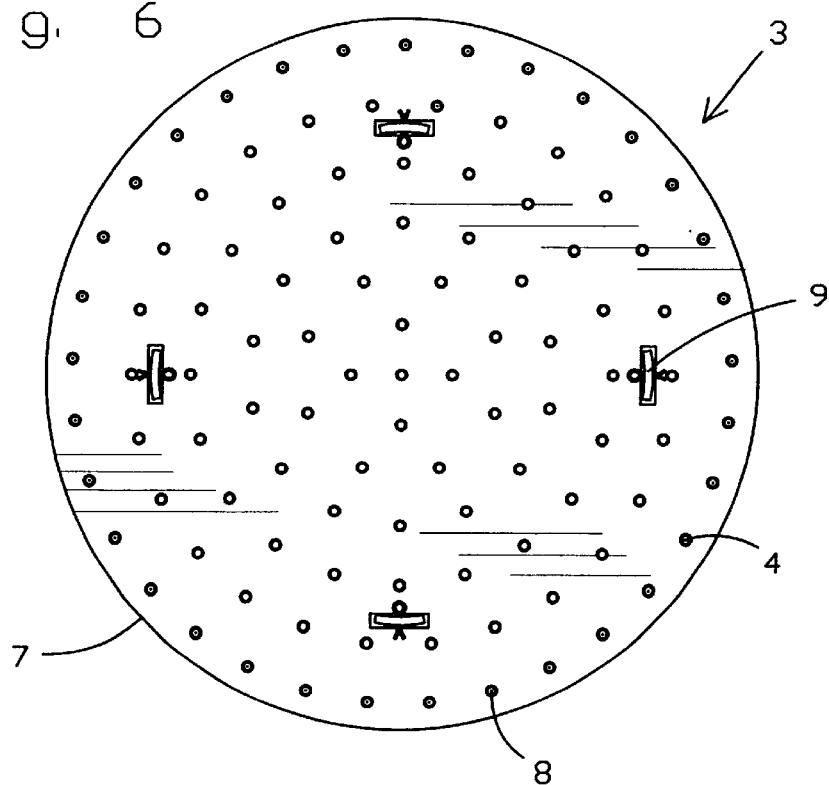
Figure 7:
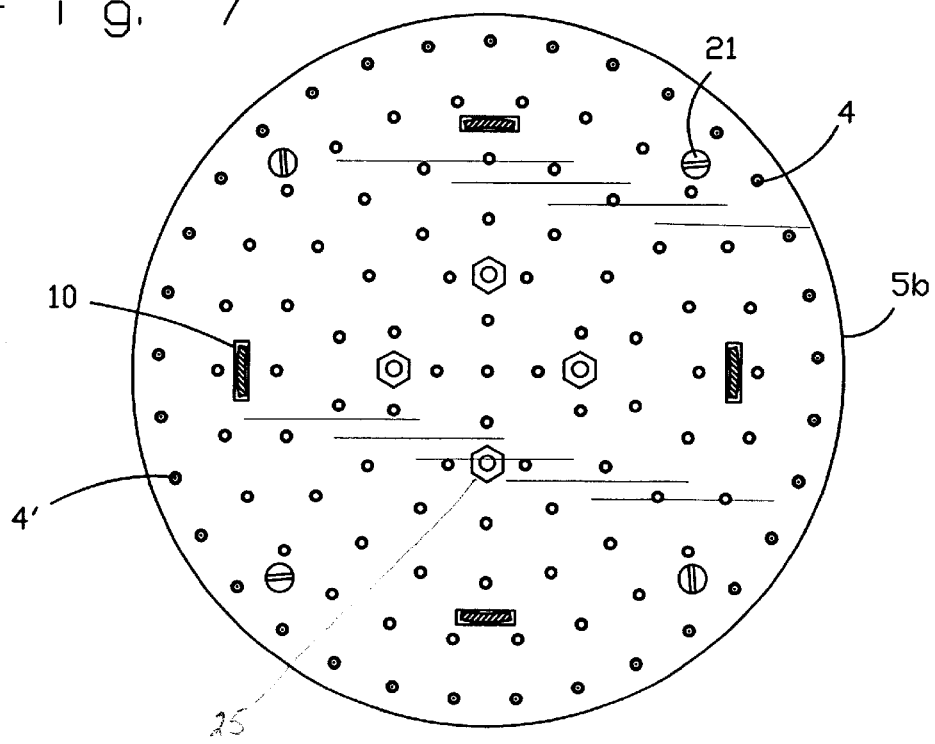
Figure 8:
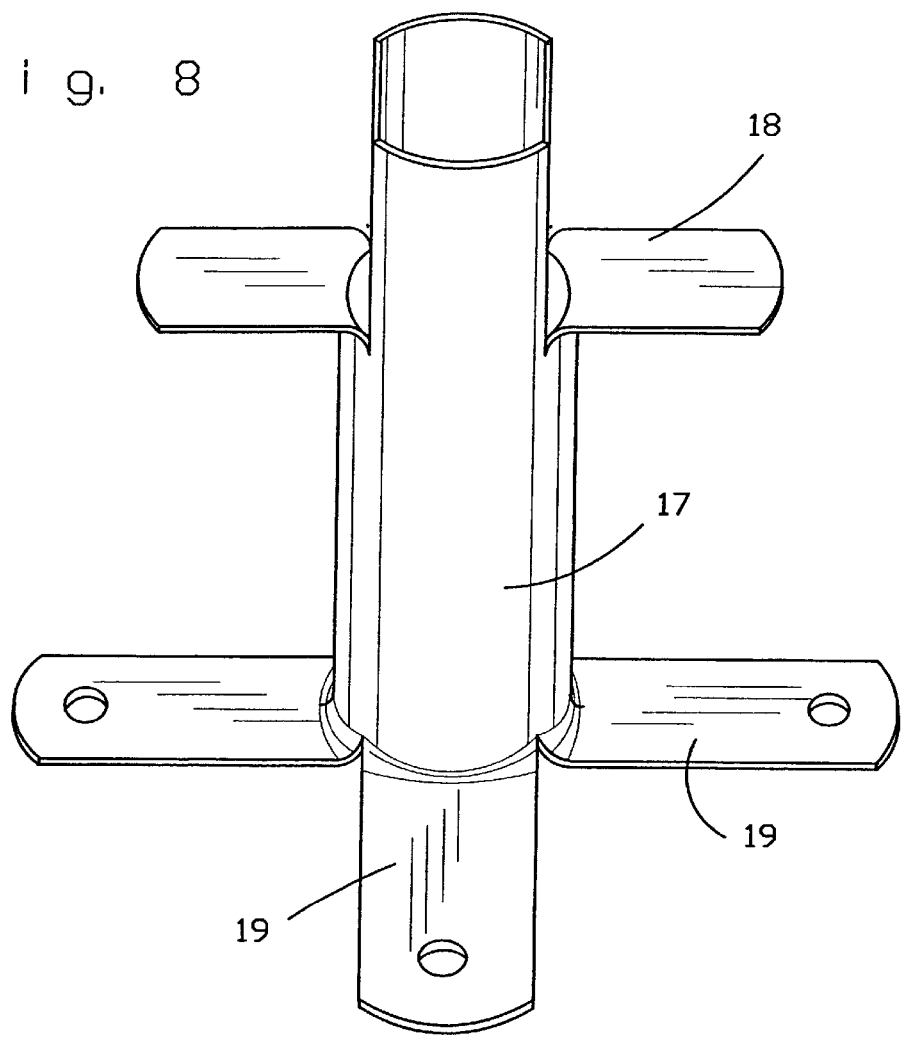
Figure 9:
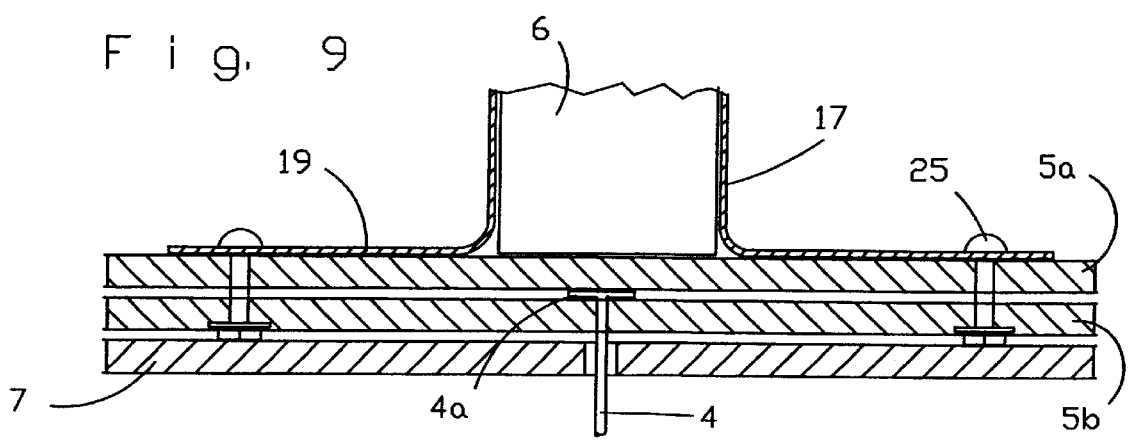

FIG. 1 shows a typical homeowner or yard keeper using a preferred embodiment of the present invention to pickup leaves scattered on a lawn;

FIG. 2 is a side view of the embodiment of FIG. 1 with the leaf discharge member of the preferred embodiment being retracted so that the device is in position to pickup leaves;

FIG. 3 shows the embodiment of FIG. 2 with the leaf discharge member in its fully extended position to discharge leaves;

FIG. 4 is a perspective view in detail of the lower portion of the embodiment showing the tines and the discharge member in greater detail;

FIG. 5 is the top plan view of the support plate of the embodiment taken along the line 5—5 of FIG. 4;

FIG. 6 is the bottom view of the device shown along lines 6—6 of FIG. 2;

FIG. 7 is the bottom view taken along the lines 7—7 of FIG. 3;

FIG. 8 is a detailed view of the support collar that carries the support plate of the embodiment; and FIG. 9 is a side view in partial section showing the support collar carrying the support plate members.

DESCRIPTION OF A PREFERRED EMBODIMENT

Referring now in more detail to the drawings, a preferred embodiment of the invention will now be described.

Looking first at FIG. 1, a typical yard keeper or homeowner 22 is shown holding the leaf pickup device 1 which is a preferred embodiment of the present invention. The lower end of the device with the sharp pointed tines is pressed against the leaves 24 which are scattered on the lawn 23 and when pressed down on the leaves the sharp tines will penetrate the leaves so that they will remain on the tines until removed by the discharge feature of the present invention which will be described in more detail hereinafter.

Turning next to FIG. 2, leaf pickup device 1 is shown in greater detail where the handheld member 2 which has at least one piercing tine comprises support shaft 6 and knob 20. Support plate 5 comprises upper plate member 5a and lower plate member 5b carrying tines 4. In an alternate embodiment the support plate can be one piece. The handheld member is a rigidly constructed member so that when pressed down upon scattered leaves on a lawn, the leaves will be pierced and adhered to the multiplicity of tines. The large number of tines ensures that multiple punctures of the leaves will take place and the leaves will stay firmly adhered to the tines. In addition, knob 20 allows the user to push down firmly causing the leaves to be completely pierced and punctured.

Referring now to FIG. 3, the leaf removal member is illustrated. The member comprises sleeve 11 which is positioned around support shaft 6 and terminates at its upper end in first pivot journal 14a which is attached to one end of lever 13. Connecting rod 16 terminates in the connecting rod pivot or second pivot 16a in lever 13. Also, attached to lever 13 is handle 15. At the other end of the connecting rod, the connecting rod terminates in third pivot 16b formed in collar 17 where the connecting rod is rotatably mounted. The collar 17 is fixedly attached to the plate members 5a and 5b.

Referring to FIGS. 3 and 4, and to FIGS. 5 and 9, coil spring 12 is positioned around the shaft 6 and rests on the upper surface 18 of collar 17. (See FIG. 8). Discharge plate support members or legs 9 extend through passageways 10 in support plates 5a and 5b to carry discharge plate 7. In the position shown in FIG. 3, the handle 15 has been rotated upwardly which results in sleeve 11 being forced downwardly and consequently discharge plate support members 9 cause the discharge plate to be forced down the length of all of the tines to the position shown in FIG. 3. This movement downwardly removes any debris or leaves that have been collected on the tines.

In FIG. 5, the top plan view of FIG. 4 is illustrated with a cutaway section of plate 5a to show the tine heads 4a whose rims are supported on the upper surface of lower support plate 5b. The tines extend through plate 5b and collectively have the appearance of FIG. 7 where section 4' of a tine is shown. The tine heads 4a are securely held between support plates 5a and 5b by plate bolt and nut fasteners 21.

In FIGS. 8 and 9 the support collar 17 is shown in greater detail. By referring to these two figures and also to FIGS. 4 and 5, it will be understood that spring 12 provides resilient mounting and is supported by spring rest 18 at its lower end and that anchor wings 19 are held to plates 5a and 5b by collar nut and bolt combination 25. Support shaft 6 is tightly wedged and held by collar 17 as shown in FIG. 9. Shaft 6 rests on plate 5a so that downward force exerted in piercing leaves is transmitted to plates 5a and 5b and then to the tines. Tine 4 is a representative tine where head 4a is held securely between plates 5a and 5b.

Now, to recap the use of my invention, the homeowner 22 of FIG. 1 pierces and picks up leaves 24 when the device 1 is in the position of FIG. 2. When leaves are on the tines 4, they may be removed by rotating the handle 15 upwardly as shown in FIG. 3. The movement of the handle 15 causes the lever 13 to rotate about pivot 16a which is fixedly attached to the support plate 5 through connecting rod 16 and collar 17. Lever 13 transmits downward force to pivot 14 and pivot journal 14a to drive sleeve 11 downwardly and cause legs 9 to push discharge plate 7 to the position shown in FIG. 3 whereby leaves are discharged from the tines 4 as the edges of the orifices 8 travel along the length of the tines 4. Spring 12 is now in compression and when handle 15 is released, discharge plate 7 will return to its position in FIG. 2 by action of the spring to complete the leaf discharge cycle.

Conventional materials may be used to construct the device 1. Typically support shaft 6 may be a cylindrical wooden member such as used for a broom or rake handle. A particularly useful length is about 26" with a diameter of ¾". The sleeve 11 may be aluminum tubing of about ⅞" i.d. with the legs 9 cut and formed therefrom. The tines 4 are preferably hard, smooth aluminum nails about 2½" long. The support plates 5a and 5b can be formed from high quality plywood, aluminum, steel, or rigid plastic material. The selection is directed towards materials that are strong yet light weight. The discharge plate may also be of high quality, high strength plywood or of a rigid plastic. Many readily available materials and combinations thereof may be used in constructing embodiments of the invention but the selection use of the many suitable materials available is within the scope of my invention.

The pattern and spacing of tines can be readily determined by those skilled in the art who have read and understood the foregoing specification. A useful spacing is about 1.35 tines per square inch. The diameter of the support plates and discharge plate may conveniently be 8" to 10" and the arrangement of tines may include 6 rings of tines. In the three outer rings the tines are about ⅞" apart and in the inner rings they are about ¾" apart. This configuration and size is suitable for medium and larger leaves such as oak, maple, dogwood, poplar, etc.

Circular, coextensive support plates are preferable but oval, rectangular or square shapes can be employed as the invention is not limited to a specific geometric shape of the plates.

For small leaves such as live oak, shrubbery trimmings, etc. the diameter of the plates is preferably 6" or 7" and the tines are spaced more closely together, e.g. about ½" apart. Tines of smaller diameter may be employed, also.

The tines, while preferably aluminum, may be steel with a smooth cylindrical shaft, sharp end, and circular flat head having a rim of greater diameter than the shaft. Alternate shaft shapes and handle configurations are also within the scope of my invention.

While a preferred embodiment of the invention has been described using specific terms, such description is for illustrative purposes only, and it is to be understood that changes and variations may be made without departing from the spirit or scope of the following claims.

What is claimed is:

1. A leaf pickup and discharge device comprising:

a) a support plate comprising upper and lower plates each having upper and lower surfaces and a plurality of passageways formed therein extending from said upper to lower surfaces, said upper plate having a collar attached thereto in a central area of the upper surface of the upper plate;

b) a plurality of leaf pickup tines extending downwardly from and perpendicularly to the lower surface of said plate;

c) a support shaft extending upwardly from said collar in the central area of the upper surface of said plate, said shaft being the handle for said device;

d) a discharge plate positioned below said lower plate, said discharge plate having upper and lower surfaces, and a plurality of orifices formed therein in a pattern corresponding to that of said tines, said orifices extending through said discharge plate from the upper to the lower surfaces thereof, the walls of said orifices being perpendicular to said upper and lower surfaces and being adapted to allow a corresponding tine to pass freely therethrough;

e) discharge plate support legs attached to the upper surface of said discharge plate, said legs extending through said passageways in said plate, said legs being disposed to move freely within said passageway;

f) a sleeve slidably disposed around said shaft, said support legs being attached to said sleeve;

g) a coil spring around said shaft positioned between said sleeve and said upper surface of the plate, said spring being compressed when said sleeve moves downwardly;

h) a discharge lever carried at one end by a first pivot, said first pivot journal being fixedly mounted with respect to said sleeve and discharge plate, the other end of said lever being provided with a handle grip, and a second pivot located between said two ends of said lever;

i) a connecting rod carried at one end in said second pivot and rotatably attached to said support plate at the other end whereby when the handle and lever are rotated upwardly said sleeve moves downwardly and said spring is compressed, said support members forcing the discharge plate downwardly for substantially the length of the tines that are disposed in the discharge plate's passageways, and leaves or debris collected on said tines will be removed therefrom by the movement of the discharge plate.

2. The device of claim 1 wherein:

a) said support plate comprises said upper and lower plate members, the lower plate member being provided with a plurality of openings;

b) each of said tines comprise a smooth tine shaft, a flat head at one end of said shaft, the other end of said shaft being pointed;

c) said tine heads having a rim of greater diameter than said tine shaft;

d) one of said tines extending through each opening and being supported by its respective rim in contact with the upper surface of said lower plate member; and e) said upper plate member covering said lower member, said members being fastened together to lock said tines firmly in place.

3. The device of claim 2 wherein said collar is a support collar attached to the upper surface of the upper plate member in the center thereof, said connecting rod being pivotally mounted at one end to a third pivot which is formed in said collar, the lower end of said coil spring being carried by a spring rest formed in the upper portion of said collar.

* * * * *